Jan. 10, 1961 E. P. AGHNIDES 2,967,581
TANDEM WHEEL VEHICLE HAVING TILTED AXLES
Filed June 26, 1956 3 Sheets-Sheet 1

INVENTOR
ELIE P. AGHNIDES
BY Moore & Hall
ATTORNEYS

Jan. 10, 1961 E. P. AGHNIDES 2,967,581
TANDEM WHEEL VEHICLE HAVING TILTED AXLES
Filed June 26, 1956 3 Sheets-Sheet 2
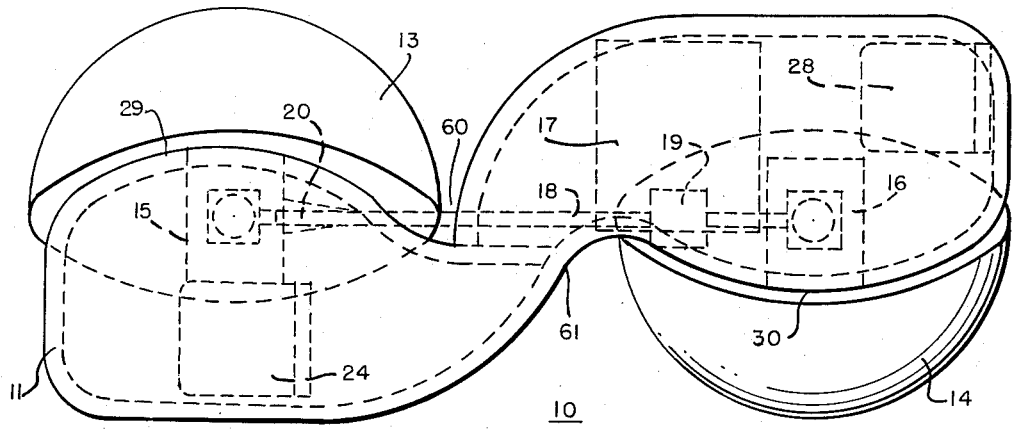
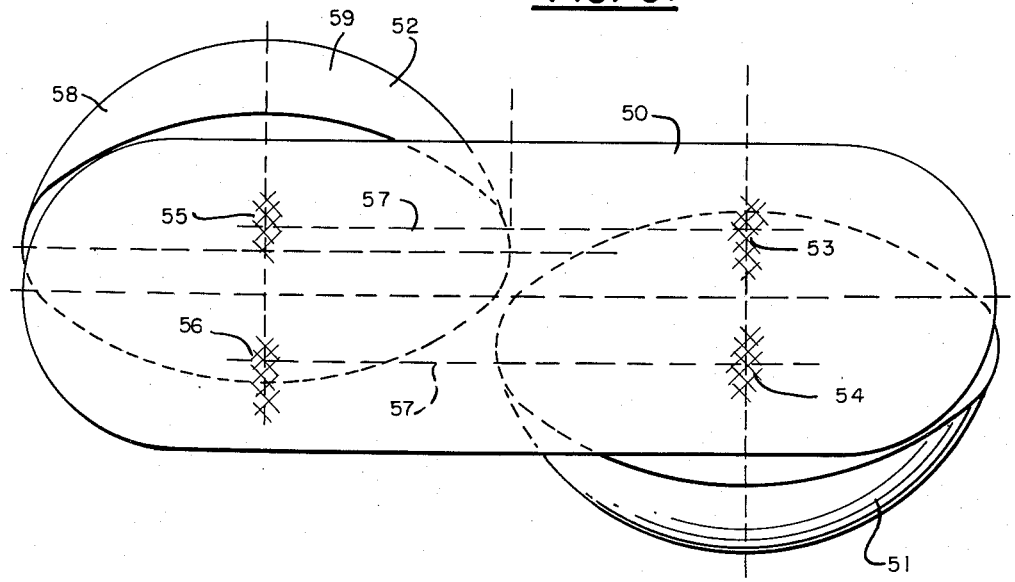
INVENTOR
ELIE P. AGHNIDES
BY *Moore & Hall*
ATTORNEYS

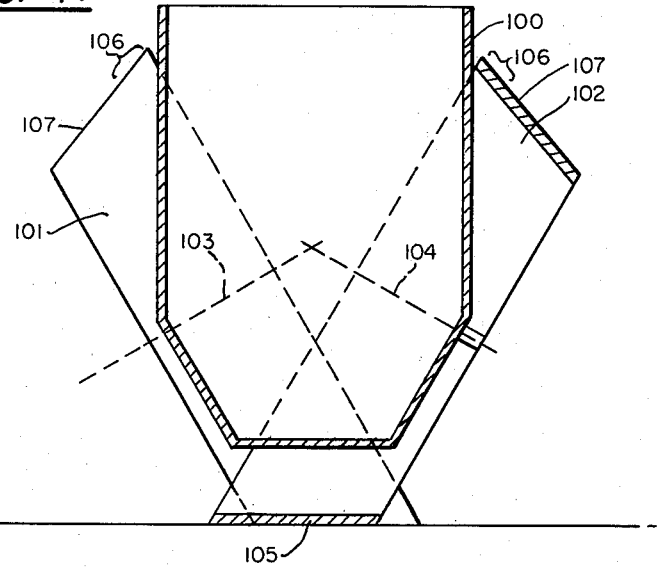
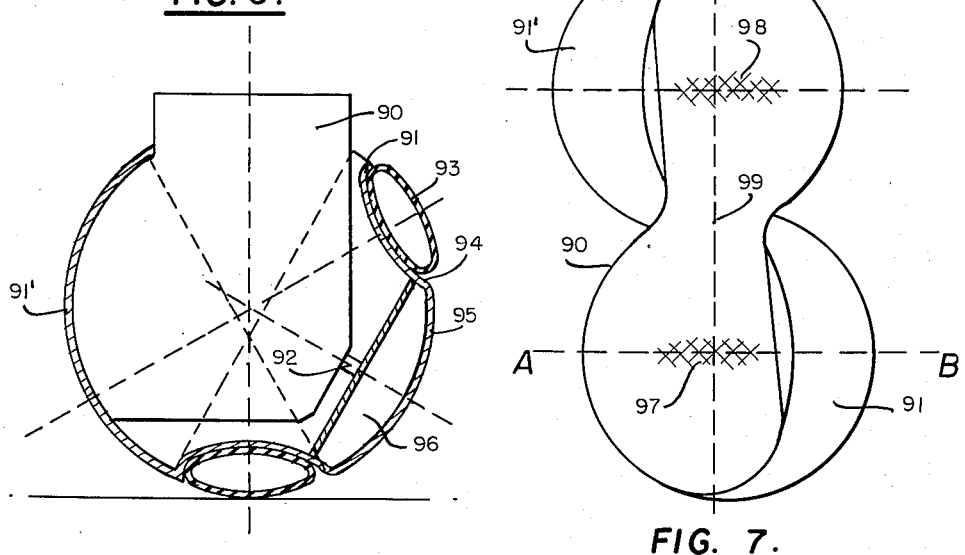
INVENTOR
ELIE P. AGHNIDES
BY Moore & Hall
ATTORNEYS

United States Patent Office 2,967,581
Patented Jan. 10, 1961

2,967,581

TANDEM WHEEL VEHICLE HAVING TILTED AXLES

Elie P. Aghnides, 46 W. 54th St., New York 19, N.Y.

Filed June 26, 1956, Ser. No. 593,853

5 Claims. (Cl. 180—30)

The present invention relates to vehicles having two wheels.

It is an object of the invention to provide a vehicle having two wheels, one on each side of the vehicle body mounted on different axles.

It is an object of this invention to provide a stable vehicle with only two wheels.

It is an object of the invention to provide a vehicle suitable for duty of any kind including the roughest terrain with mud conditions by using wheels of large diameter and width, maintaining high flotation properties with a low weight factor.

It is an object of the invention to eliminate the underside of conventional vehicles between each pair of wheels as well as between front and rear wheels.

It is an object of the invention to provide a vehicle which rolls along a single track.

Another object of the invention is to provide a vehicle that may operate in sand and/or mud.

It is an object of the invention to decrease width and increase capacity in cross-country vehicles using wheels of large diameter and width.

It is an object of the invention to provide a vehicle with wheels of considerable width, hollow on the inside and shaped to wrap around the vehicle body and so decrease its overall width.

It is an object of the invention to provide a vehicle with the underside shielded by the wheels to permit the lowering of the underside of the vehicle body and of the center of gravity.

These and other advantages of the present invention will be made clear in the description of the several figures offered by way of examples of actual embodiments of the invention. These showings are to be taken as illustrative and not as limiting.

In vehicles having two wheels mounted coaxially, the body is unstable. I have found that two hemispheroidal wheels on opposite sides of the vehicle, one near the front end and the other near the rear, with the axes of the wheels pointing outwardly and downwardly will stabilize the body. Two such wheels will act as the entire support for the vehicle. The hemispheroidal wheels preferably have their inner edges passing through indents in the body so that these edges pass under the vehicle. It is also preferable for the rear wheel to contact the ground substantially directly to the rear of the place where the front wheel touches the ground. Means, including an engine, is employed to drive the vehicle.

In my U.S. Patent No. 2,372,043 entitled Motor Vehicle, granted March 20, 1945; and in my copending application for Vehicle with Inclined Hemispheroidal Wheels, Serial No. 362,700, filed June 19, 1953 and since issued as Patent No. 2,812,031, I have described vehicles mounted with two hemispheroidal wheels. Further, in my copending application of "Vehicle with Tiltable Wheels," U.S. application Serial No. 476,239, filed December 20, 1954, I have also shown tilted wheels.

In the drawings like numerals refer to like parts throughout.

Figure 3 is a top view of the vehicle of Figure 1.

Figure 4 is a front view of a modified form of the invention.

Figure 5 is a schematic plan showing one arrangement of areas contacted by the wheels with the wheels and chassis sketched in.

Figure 6 is a vertical section of a modified form of the invention taken along line A—B of Figure 7.

Figure 7 is a top view of a modified form of the invention.

Figure 1:
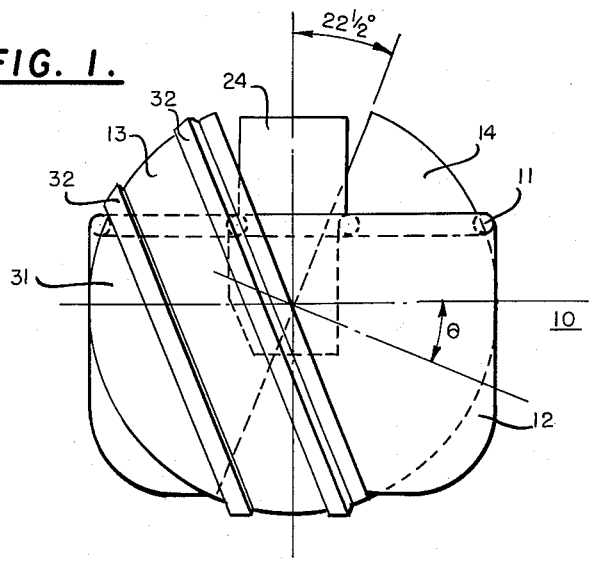
Figure 1 is a front elevation of one form of vehicle according to the invention.
Figure 2:
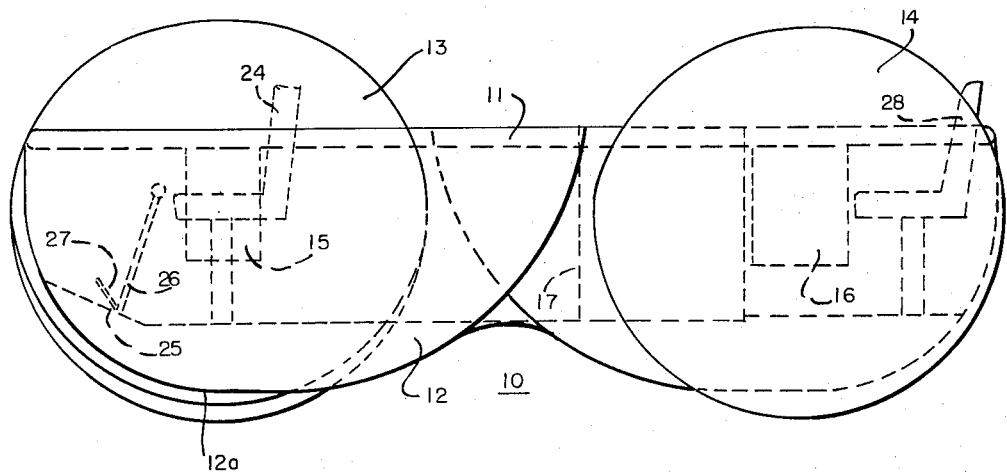
Figure 2 is a side elevation of the vehicle of Figure 1.

Figures 1–3 show a vehicle 10 having a tubular frame 11 carrying a body portion 12. The frame 11 comprises what may be referred to as an S shape and mounts hemispheroidal wrap-around front and rear wheels 13 and 14 which are angularly mounted as shown by the angle $\theta$ which may preferably be assigned a value between 20 and 30 degrees. Within the vehicle 10 are provided wheel drive gear boxes 15 and 16 arranged to supply power to wheels 13 and 14 selectively. The gear boxes indicated generally at 15 and 16 are driven by a motor indicated at 17 through a suitable shaft 18 and a transmission and transfer case 19. Speed control is effected by accelerator 25 and gear lever 26. Power brake pedals 27 may be used to control car speed. Although only two seats 24 and 28 are shown, it will be understood that others may be provided as described.

Each wheel includes tires 32 and the portion 31 to complete the hemispheroid.

It will be seen that the tubular frame 11 has curved portions 29 and 30 which fit into hemispheroidal wheels 13 and 14 respectively, the wheel structure providing a wrap-around effect. As shown in Figure 3 the frame has indents 60 and 61 through which respectively pass the inner edges 62 and 63 of the wheels 13 and 14.

Figure 4 shows another modification suitable for leveling roads in which a chassis 100 mounts two wheels 101 and 102 with their axes 103 and 104 on a diagonal. The wheels 101 and 102 comprise frusto-conical segments with their section of larger diameter turned inward to enclose the chassis 100. Here again the wheels 101 and 102 are built to track each other, as shown at 105. It is understood that whether the wheels have two treads, whether they are composite or not, they may be of overall frusto-conical shape, if desired.

Figure 5 is a schematic diagram showing a chassis outline 50 having two tilted axis wheels 51 and 52 mounted thereon. Wheels 51 and 52 may be composite (as shown in my copending application Serial No. 593,959, filed on even date herewith and entitled Composite Wheel) or in one piece. Surfaces 53 and 54 are contacted by the tires of wheel 51. It will be seen that surface 55 tracks with surface 53 and surface 56 tracks with surface 54. The surfaces thus follow two parallel lines shown dotted at 57. In Figures 1 to 3 it will be seen that the belly 12a is raised, the two wheels being at a certain distance from each other.

Figures 6 and 7 show a modified form suitable for use wherever a single track is desired, in which a chassis 90 mounts a wheel 91 at a suitable angle by means of a shaft 92. Wheel 91 is hemispherical and has a tire 93 mounted in a suitable recess 94. The tires 93 are elliptical in cross-section and the wheels are so tilted and spaced as to contact the ground preferably on a horizontal line 99 which is the longitudinal axis of the vehicle. A rounded portion 95 rounds out the hemispherical shape of the wheel 91. Here again the chamber 96 aids in flotation together with the tires. The opposite wheel is indicated at 91'. As shown by contact areas 97 and 98, the wheels 91 and 91' are preferably construced to track. It will be understood that in this modification as well as in all the others, the center of gravity of the vehicle is placed low enough to insure stability.

In vehicles having wheels each with two rolling treads, one tread on each wheel may bear most or all of the weight of the vehicle, the other tread serving to keep sidewise rocking of such an arrangement to a minimum and to decrease scuffing.

When the wheels are relatively large in diameter, it is preferable to locate the two wheels close together and reduce the length of the vehicle, so that the usual belly between the front and rear wheels is practically eliminated, as shown in Figure 5. If the vehicle is intended to travel at low speed, a greater tilt of the wheels than the drawings show can be adopted to increase traction surface and vehicle body capacity.

The tubular construction of the frame must be designed for high strength in the narrow area between the wheels. A medium size vehicle may have a diameter of wheel about five feet high, be five feet wide and ten to twelve feet long. Smaller or much larger diameters can be adopted according to the capacity needed. A summary of advantages includes cross-country travel in roadless terrain, high flotation in marshes, snow, sand and deep mud; amphibious operation across rivers and successful operation in areas not possible with ordinary vehicles.

In all the forms of invention shown in the drawings there is a ring shaped rolling surface (32, 58, 106) adjoining the inner edge of the wheel, and an extended rolling surface (31, 59, 107) extending outward from the ring shaped rolling surface.

While there have been described above what are at present believed to be the preferred forms of the invention, other forms will suggest themselves to those skilled in the art. All such variations as fall within the true spirit of the invention are intended to be covered by the generic terms of the claims set forth below.

I claim:

1. A vehicle having a body with two wheels on opposite sides of the vehicle one of which is near the front of the vehicle and the other near the rear, which wheels taken together entirely support the body, each said wheel having its axis pointing outwardly and downwardly with the inner lower portion of the wheel located under the body, each said wheel being generally hemispheroidal with the wheel diameter generally decreasing as the distance from the body increases.

2. A vehicle as defined in claim 1 in which the rear wheel is positioned to touch the ground, during straight-ahead motion of the vehicle, substantially directly to the rear of the engagement of the ground by the front wheel.

3. A vehicle having a frame with two indents respectively extending inward from opposite sides of the frame and spaced longitudinally from each other, two wheels respectively on opposite sides of the vehicle, one near the front and one near the rear of the vehicle and each wheel having its axis pointing outwardly and downwardly, each wheel having its inner edge rotating through one of said indents and said inner edge extending below the frame, each wheel having a generally decreasing diameter as the distance measured axially outwardly increases, at least a portion of the rear wheel being positioned, during straight-ahead motion of the vehicle, substantially directly to the rear of at least a portion of the front wheel.

4. A vehicle as defined in claim 3 in which each said wheel is hemispheroidal.

5. A vehicle having a frame structure and two load-carrying ground-contacting wheels respectively located on opposite sides of the vehicle with one near the front and the other near the rear, said frame structure including means maintaining the axes of said load-carrying ground-contacting wheels pointing outwardly and downwardly, each said wheel having a ring shaped rolling portion and also including an extended rolling surface adjacent the ring shaped portion and extending away from the outer part of said portion with a generally decreasing diameter measured in planes perpendicular to the axis of rotation, at least a part of said rear wheel being positioned, during straight-ahead motion of the vehicle, substantially directly to the rear of at least a part of said front wheel, and an engine carried by the frame for driving at least one of said wheels.

References Cited in the file of this patent

UNITED STATES PATENTS

| 864,622 | Domis | Aug. 27, 1907 |
| 1,257,416 | Sperry | Feb. 26, 1918 |
| 2,212,589 | Decker | Aug. 27, 1940 |
| 2,372,043 | Aghnides | Mar. 20, 1945 |
| 2,812,031 | Aghnides | Nov. 5, 1957 |

FOREIGN PATENTS

| 675,845 | France | Nov. 18, 1929 |